United States Patent [19]

Ikeda et al.

[11] Patent Number: 6,119,145

[45] Date of Patent: Sep. 12, 2000

[54] MULTITHREADED CLIENT APPLICATION STORING A SEPARATE CONTEXT FOR EACH TRANSACTION THUS ALLOWING THREADS TO RESUME TRANSACTIONS STARTED BY OTHER CLIENT THREADS

[75] Inventors: Nancy Ikeda; Michael Chiocca, both of Mountain View; Julie Basu, San Mateo, all of Calif.

[73] Assignee: Oracle Corporation, Redwood Shores, Calif.

[21] Appl. No.: 08/858,616

[22] Filed: Feb. 28, 1997

[51] Int. Cl.[7] .............................. G06F 15/16; G06F 9/00; G06F 7/00
[52] U.S. Cl. ................................ 709/203; 709/100; 707/8
[58] Field of Search ................................ 395/670; 707/1, 707/8; 709/100, 203

[56] References Cited

U.S. PATENT DOCUMENTS

| | | | |
|---|---|---|---|
| 5,249,293 | 9/1993 | Schreiber et al. | 709/203 |
| 5,398,336 | 3/1995 | Tantry et al. | 707/103 |
| 5,430,876 | 7/1995 | Schreiber et al. | 709/304 |
| 5,680,610 | 10/1997 | Smith et al. | 707/10 |
| 5,692,192 | 11/1997 | Sudo | 709/105 |
| 5,745,703 | 4/1998 | Cetjin et al. | 395/200.68 |
| 5,754,771 | 5/1998 | Epperson et al. | 395/200.33 |
| 5,796,393 | 8/1998 | MacNaughton et al. | 345/329 |
| 5,825,358 | 10/1998 | Silvent et al. | 345/340 |
| 5,852,732 | 12/1998 | Freund et al. | 709/101 |
| 5,872,969 | 2/1999 | Copeland et al. | 709/101 |
| 5,875,334 | 2/1999 | Chow et al. | |
| 5,914,713 | 6/1999 | Nario et al. | |
| 5,930,794 | 7/1999 | Linenbach et al. | |
| 5,930,795 | 7/1999 | Chen et al. | |
| 5,970,248 | 10/1999 | Meier | 395/704 |
| 6,038,562 | 3/2000 | Anjur et al. | 707/10 |

OTHER PUBLICATIONS

Birrell, A., "An Introduction to Programming with Threads," DEC Systems Research Center, pp. 1–33, Jan. 1989.

*Primary Examiner*—Zarni Maung
*Assistant Examiner*—Andrew Caldwell
*Attorney, Agent, or Firm*—Hickman Palermo Truong & Becker, LLP; Brian D. Hickman; Carina M. Tan

[57] ABSTRACT

A multithreaded client application initiates multiple database operations associated with at least one transaction. The client application allocates and stores a separate runtime context for each of the database transactions. These transaction runtime contexts are also distinct from the state information, or runtime context, of the thread initiating a particular operation of the transaction. As a result, operations started by a thread that terminates may be continued, or resumed, by a subsequent thread without having to reperform previously executed operations. The duration of the transactions' runtime context is thus decoupled from the duration of the thread's runtime context. Special syntax and routines are provided for explicitly allocating a runtime context and deallocating a runtime context.

7 Claims, 1 Drawing Sheet

MULTITHREADED CLIENT APPLICATION STORING A SEPARATE CONTEXT FOR EACH TRANSACTION THUS ALLOWING THREADS TO RESUME TRANSACTIONS STARTED BY OTHER CLIENT THREADS

FIELD OF THE INVENTION

The present invention relates to database systems, and more specifically, to a method and apparatus providing for runtime context migration in multithreaded database applications.

BACKGROUND OF THE INVENTION

Multithreading environments allow different parts of a process, known as threads, to execute simultaneously. Multithreading processes must be carefully designed so that all of the threads can execute simultaneously without interfering with each other.

As a thread executes, data must be maintained to indicate the current state of the operations being performed by the thread. This information is generally referred to as a runtime context. The runtime context of a thread includes all of the information associated with the execution state of that thread including, for example, local data, memory and system resource information such as database server connections.

In database applications, clients submit requests to a database server to perform operations on a database. Such operations may, for example, cause the database server to retrieve a particular set of data from the database and send the data to the client. Database applications in which an application server can concurrently service more than one client are referred to as three-tiered database applications.

In three-tiered database applications, multithreading is frequently used to reduce transaction processing time. Each client process may employ several threads, each of which establishes and maintains its own connection to a database server for performing operations specified by a transaction. In some circumstances, processing a transaction with multiple threads can be much faster than processing the same transaction using a single thread within a process.

Despite the favorable performance advantages offered by multithreading, the multithreading approach is not without its disadvantages. In some multithreading environments, runtime context information, such as database server connections, cannot be shared between threads. As a result, each thread must establish and maintain its own runtime context, including any database server connections, requiring significant system resources each time a new thread is spawned.

In addition, in some multithreading environments, the runtime context associated with a thread is lost when the thread terminates—either abnormally (because of an error) or by design (because a unit of work has been completed). Consequently, when a thread terminates prior to the termination of the program to which the thread belongs (transient thread), a runtime context must be properly re-established for another thread, since the runtime context associated with the terminated thread is lost and cannot be used to resume processing from where the terminated thread stopped processing. Re-establishing a runtime context might require re-executing the operations already performed by the terminated thread.

In view of the benefits provided by multithreading and the limitations in prior multithreading approaches, a multithreading approach which provides for the sharing of runtime context information between threads is highly desirable. In fact, even a single threaded application might find it convenient to establish and use multiple runtime contexts, especially when isolation between multiple database transactions is necessary.

SUMMARY OF THE INVENTION

A method and apparatus for passing runtime contexts between threads in a multi-threaded application is provided. A precompiler is provided which allows programmers to declare and use runtime contexts in the same manner as other conventional variable types are declared and used. Special syntax and routines are provided for explicitly allocating a runtime context and deallocating a runtime context, thus decoupling the duration of a runtime context from the duration of the thread that initiated the operations whose states are stored in the runtime context. Consequently, operations started by a thread that terminates may be continued by a subsequent thread without having to re-perform previously executed operations. Precompiler directives are provided to explicitly state which runtime contexts will be used for certain operations. A single thread can therefore use one or more runtime contexts.

BRIEF DESCRIPTION OF THE DRAWINGS

The present invention is illustrated by way of example, and not by way of limitation, in the figures of the accompanying drawings and in which like reference numerals refer to similar elements and in which.

THE DETAILED DESCRIPTION OF THE PREFERRED EMBODIMENT

Figure 1:
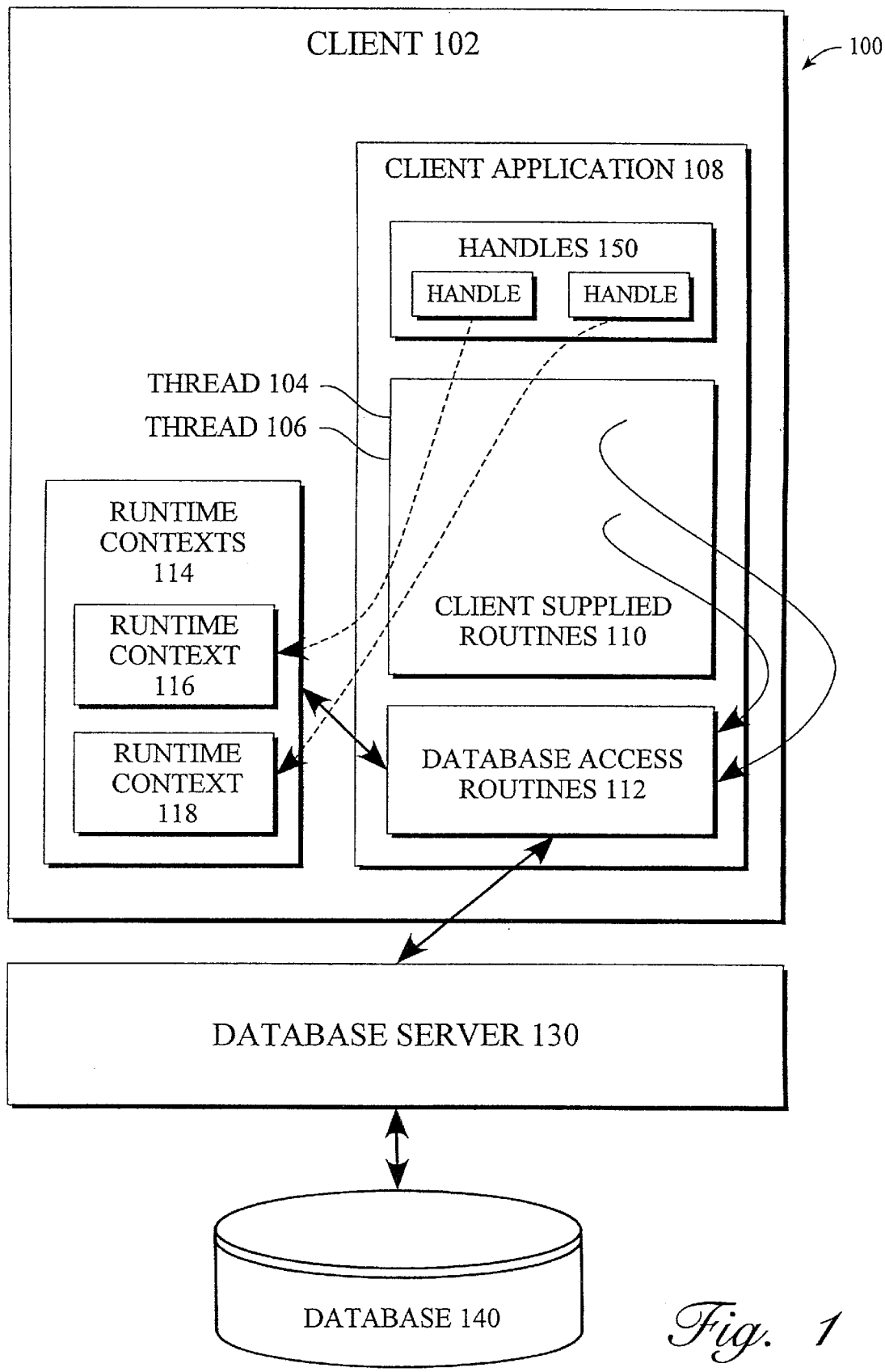
FIG. 1 illustrates a multithreading client application in which runtime contexts are decoupled from the threads according to an embodiment of the invention.

A method and apparatus for passing runtime context information between threads is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Thread-Independent Runtime Contexts

According to an embodiment of the invention, the runtime contexts that store the state of operations invoked by threads are decoupled from the threads that invoked the operations. For example, a thread A may submit a query to a database and fetch the first ten rows of data that satisfy the query. Thread A may then terminate and thread B may fetch the next ten rows that satisfy the query. Significantly, thread B fetches the next ten rows without having to resubmit the query and refetch the first ten rows. This is made possible by allowing thread B to acquire control of the runtime context that was updated in response to the operations performed by thread A.

According to one aspect of the invention, a mechanism is provided for allowing programmers developing database clients to explicitly specify in the source code of a client program the runtime context that will be in effect during specific routines. Specifically, programmers may declare runtime context variables, which may be treated as any other type of variable. For example, the scope of a runtime context variable is determined by the context in which the runtime context variable is declared. In addition, runtime context variables may be passed as parameters to routines.

According to another aspect of the invention, a precompiler is provided for allowing client programmers to declare and use runtime context variables even though the host programming language of the client application (e.g. C++) does not explicitly support runtime context variables. As shall be explained in greater detail below, the precompiler converts source code statements that involve runtime context variables to source code statements that are supported by the host programming language. The resulting source code statements compile to generate code which, when executed, allows runtime contexts to be shared among the threads as specified in the original source code.

Exemplary Database System

Referring to FIG. 1, it illustrates an exemplary database system 100 configured according to an embodiment of the invention. System 100 includes a multithreaded client application 108 that communicates with database server 130 to access and retrieve data stored in a database 140. Client application 108 resides in memory within a client 102. Database server 130 may or may not reside within the same physical machine as the client application 108.

The client application 108 includes client-supplied routines 110 and database access routines 112. Client-supplied routines 110 generally represent code which is compiled from the source code written by a client application programmer. Typically, such code does not contain the routines that interact directly with the database server 130. Rather, all interactions with the database server are made through calls to the database access routines 112.

The database access routines 112 generally represents those portions of the client application 108 that govern interaction with the database server 130. This code is typically supplied to the client application programmer by a third party, such as the vendor of the database server. For example, the database access routines 112 may be SQLLIB and OCI routines supplied by and available from Oracle Corporation which communicate with the Oracle Database Server using the SQL*Net networking software from Oracle. The database access routines 112 are typically linked with the client supplied routines 110 to create the client application 108 after the client supplied routines 110 have been compiled.

Runtime Context Maintenance

As mentioned above, database access routines 112 are the routines that interact with the database server 130. To perform database operations, the client supplied routines 110 make calls to the appropriate database access routines 112. For example, a routine A in the client supplied routines 110 may cause a form to be displayed on a display device, where the contents of the form is data from database 140 that satisfies certain criteria. To retrieve the data to be displayed, the routine A calls a routine B in the database access routines 112. In response to the call, routine B issues to the database server 130 a statement that requests the retrieval of data that satisfies the criteria. The database server 130 executes the statement and passes back to routine B the first N records that satisfy the criteria. Routine B passes the N records back to routine A and routine A displays the records.

In addition to acting as an intermediary between the client supplied routines 110 and the database server 130, the database access routines 112 keep track of the execution status of the statements that have been issued to the database server 130. This status information is generally represented by runtime contexts 114.

In the illustrated embodiment, database access routines 112 are maintaining two runtime contexts 116 and 118. Runtime context 116 may be, for example, the runtime context created to track the execution status of the statement issued to the database server 130 by routine B in response to the call from routine A. As such, the runtime context 116 may include, for example, the cursor associated with the statement, data identifying the database connection used to issue the statement to the database server 130, and values associated with variables. Data in the runtime context 116 also indicate that N records have already been fetched from the database server 130.

Runtime Contexts With a Multi-Threaded Client

In the system 100 illustrated in FIG. 1, two client threads 104 and 106 are currently executing. When either of these threads reaches a code section that requires interaction with the database server 130, a call is made to the database access routines 112. In the past, the database access routines 112 store the runtime context for a thread in memory that is accessible only to that thread. For example, if thread 104 invokes a database access routine 112 to submit a statement A to the database server 130, the runtime context for the statement would be maintained in a memory location to which only thread 104 has access. Limiting access to runtime contexts to those threads for which the runtime contexts are initially created works well when all threads are persistent (i.e. continue to execute until the client application to which they belong is terminated). However, in environments where threads may be transient, the termination of a thread may result in the premature loss of a runtime context.

To prevent the loss of state information when threads terminate, runtime contexts 114 are stored in memory that is not tied to any particular thread, and therefore is accessible to every thread. Such memory is referred to herein as persistent memory because the data stored therein is not automatically lost at the termination of a thread. For example, thread 104 may terminate after runtime context 116 has been established and N records have been retrieved from database server 130, but before client application 108 itself is terminated. Upon the termination of thread 104, runtime context 116 is not lost. Rather, thread 106 may assume control of runtime context 116 and continue fetching records from the database server 130 that satisfy the criteria submitted by thread 104, beginning at record N+1.

Runtime Context Identification

In systems where runtime contexts are inextricably tied to specific threads, the database access routines 112 know which runtime context to use for any given operation based on the identity of the thread that invokes the operation. However, embodiment of the present invention eliminate any fixed mapping between threads and runtime contexts. Consequently, the identity of a thread is not sufficient to identify the runtime context that should be used during an operation. Consequently, client supplied routines 110 are configured to identify a specific runtime context through use of handles 150 when invoking database access routines 112 that require a runtime context. Conversely, database access routines 112 that perform operations that require a runtime context are configured to receive as an input parameter a value that uniquely identifies a runtime context.

Precompilers

Typically, general purpose programming languages such as C++ do not directly support statements written in database query languages, such as the Structured Query Language (SQL). However, it is generally considered easier to specify a database operation in SQL (or another database query language) than to write code that invokes a potentially complex sequence of database access routines 112 to perform the database operation. Therefore, precompilers have been developed to allow client application programmers to specify database operations by embedding SQL statements in their source code. The precompilers read the source code files that contain embedded SQL statements and generate source code files in which the embedded SQL statements have been replaced with calls to database access routines 112 to perform the operation specified in the embedded SQL statements that they replace.

As mentioned above, the client supplied routines 110 must specify a runtime context to be used when calling database access routines 112 that require a runtime context. Consequently, according to an embodiment of the invention, a precompiler is provided which converts the embedded SQL statements into database access routine calls which provide a runtime context as an actual parameter. Through use of handles 150, the client application programmer directs the precompiler to use a particular runtime context in the generated database access routine calls.

Runtime Context Variables

According to an embodiment of the invention, client application programmers can declare and use variables that correspond to runtime contexts in the same manner as other types of variables. For example, a user may declare two runtime context variables by the declaration:

```
sql_context ctx1, ctx2;
```

A routine "f1" for executing a particular database operation may then be declared, where the f1 routine is not tied to any particular runtime context during the execution of the operation. For example, consider the routine:

```
f1(ctx)
sql_context ctx;
{
EXEC SQL CONTEXT USE: ctx;
EXEC SQL FETCH C1;
}
```

In this routine the CONTEXT USE statement specifies which runtime context is to be used for all subsequent embedded SQL statements that follow the CONTEXT USE statement. In this case, the runtime context that is to be used with the fetch statement is the runtime context "ctx" that is passed as an input parameter to the routine f1. The identifier C1 corresponds to a cursor which identifies the result set of a query. The routine f1 fetches a "next value" from the result set associated with C1. Thus, the value that will be fetched in the fetch statement will be determined by the runtime context variable ctx that is passed to routine f1 in any particular call to routine f1. For example, routine f1 may be invoked by the following routine:

```
f2()
{
EXEC SQL CONTEXT ALLOCATE: ctx1;
EXEC SQL CONTEXT ALLOCATE: ctx2;
/* initiate query */
f1(ctx1);
f1(ctx2);
/* process query results */
}
```

Routine f2 contains two "allocate" statements which, when encountered by the precompiler, are translated to calls to a database access routine 112 which allocates memory for runtime contexts. Consequently, when routine f2 is executed, a database access routine 112 may allocate runtime context 116 for runtime context variable ctx1, and runtime context 118 for runtime context variable ctx2. The database access routine 112 that performs this allocation returns a handle to each newly allocated runtime context.

After runtime contexts 116 and 118 are allocated, routine f2 makes two calls to routine f1. During the first call, the runtime context variable ctx1 is passed to routine f1. During runtime, this call will pass the handle to runtime context 116 to the code that implements routine f1. In response to this call, routine f1 will fetch the next value from the result set identified by a cursor stored in the runtime context 116 associated with ctx1. During the second call, the runtime context variable ctx2 is passed to routine f1. In response to this call, routine f1 will fetch the next value from the result set identified by a cursor stored in the runtime context 118 associated with ctx2.

In the example given above, the same routine f1 is used to fetch from cursors stored in two distinct runtime contexts even though the cursor in runtime context 116 is associated with a completely different query than the cursor in runtime context 118. Thus, routine f1 represents a routine that requires a runtime context, but which is not hard-coded in a way that limits the routine to any particular runtime context. The ability for client application programmers to write such context-independent routines is one of many benefits provided by the present invention.

Programming Extensions

According to an embodiment of the invention, a conventional programming language is extended with statements which (1) declare runtime context variables, (2) allocate runtime contexts, (3) deallocate runtime contexts, and (4) specify the runtime context to be used in subsequent operations.

Statements which declare runtime context variables are compiled to code which allocates memory for storing handles to runtime contexts. These statements establish a correlation between an identifier (e.g. ctx1) and a handle. Initially, the handle may be set to NULL to indicate that the handle does not yet point to any runtime context.

As with other types of variables, the placement of the declaration of a runtime context variable determines the scope of the runtime context variable. For example, assume that the source code contains two functions:

```
f1()
{
sql_context ctx1;
EXEC SQL CONTEXT USE: ctx1;
EXEC SQL INSERT INTO . . .
}
f2()
{
EXEC SQL UPDATE . . .
}
```

The runtime context variable ctx1 is declared in a location that makes the variable local to the routine f1. The variable ctx1 is therefore not visible to the f2 routine. However, the runtime context associated with ctx1 must be used to perform the UPDATE statement in the f2 routine. Consequently, the compiler will return an error message upon encountering the UPDATE statement in the f2 routine.

EXEC SQL CONTEXT ALLOCATE: ctx statements are compiled to code which makes calls to (1) allocate memory for storing runtime contexts and (2) update the handle associated with the runtime context variable specified in the EXEC SQL CONTEXT ALLOCATE statement so that the handle points to the memory allocated for the runtime context.

EXEC SQL CONTEXT FREE: ctx statements are compiled to code which makes calls to deallocate the memory pointed to by the handle associated with the runtime context variable specified in the EXEC SQL CONTEXT FREE statement. Significantly, this deallocation does not take place automatically upon the termination of the thread that initially allocated the runtime context. Consequently, subsequent threads are free to use allocated runtime contexts that were previously allocated and used by threads that have terminated.

EXEC SQL CONTEXT USE: ctx statements do not themselves compile to code. Rather, USE statements serve as directives to the precompiler to indicate which runtime context to use when generating code for subsequent executable SQL statements. For example, assume that an INSERT INTO statement in embedded SQL is normally translated into calls to three database access routines: f1, f2 and f3. Under these conditions, the precompiler would translate the embedded SQL statements:

```
EXEC SQL CONTEXT USE: ctx1;
EXEC SQL INSERT INTO . . .
EXEC SQL CONTEXT USE: ctx2;
EXEC SQL INSERT INTO . . .
``` into the host language source code statements:

```
f1(ctx1, . . .);
f2(ctx1, . . .);
f3(ctx1, . . .);
f1(ctx2, . . .);
f2(ctx2, . . .);
f3(ctx2, . . .);
```

According to one embodiment, the precompiler is configured so that USE statements affect all executable SQL statements which positionally follow them in a given source file without regard to standard host language scoping rules. Consequently, the runtime context specified in a USE statement in one routine will be passed as an input parameter to routines which implement embedded SQL statements until another other USE statement is encountered.

Benefits of Runtime Context Variables

Numerous advantages are attained by allowing client application programmers to declare and use runtime context variables in the manner described above. For example, there is a significant amount of overhead associated with establishing a connection with the database. When a thread takes control of an existing runtime context, the thread is free to use the connection identified in the runtime context which has already been opened by a previous thread. If the runtime context used by the prior thread is not available, then the thread must establish a new connection and incur the associated overhead cost.

In addition, the ability to pass runtime contexts between threads preserves the performance benefits of multithreading environments without the problems associated with transient threads. Specifically, the termination of a transient thread does not have to result in losing the state of all operations performed by the transient thread. Other threads can pick up where the terminated thread left off without having to reprocess all operations performed by the transient thread. Since the integrity of the runtime context is not lost when a thread terminates, the runtime context may provide useful information during error recovery.

Further, the present invention allows any number of runtime contexts to be allocated and passed to threads. However each database access routine uses at most one runtime context. The present invention is not limited by a one-to-one thread-to-context mapping that prevents more than one runtime context from being passed to and used by a single thread.

By providing an explicit RUNTIME CONTEXT FREE statement, a client programmer may deallocate runtime contexts at any time, independent of the runtime state of a thread. The ability to deallocate a runtime context without terminating a thread may be useful under certain conditions to reduce memory consumption.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for performing a set of operations in a multithreading process environment, the system comprising:

a) one or more nodes that are clients of a server;

b) a first thread executing on the one or more nodes and being configured to initiate the performance on the server of the set of operations and to store data associated with the runtime state of the first thread in a runtime context that is stored on the one or more nodes; and c) a second thread executing on the one or more nodes and being configured to resume performance on the server of the set of operations and to store data associated with the runtime state of the second thread in the runtime context that is stored on the one or more nodes.

2. The system of claim 1, wherein the second thread is further configured to resume performance of the set of operations and to store data associated with the runtime state of the second thread in the runtime context only if the first thread process cannot complete performance of the set of operations.

3. A method for ensuring the completion of an operation initiated by a multithreading client application, the method comprising the steps of:

causing a first thread of said multithreading client application to initiate performance of the operation by a server;

storing in memory of said multithreading client application a set of state information associated with the operation;

based on said set of state information, causing a second thread of said multithreading client application to cause said server to continue performance of the operation beginning where the first thread caused said server to discontinue performance of the operation; and updating said set of state information based on actions performed by said second thread.

4. The method of claim 3, further comprising the step of deallocating, independent of the runtime state of the first and second threads, the memory in which said set of state information is stored.

5. A method for processing a database transaction in a multithreading environment, the method comprising the steps of:

a) allocating a runtime context on a client executing a database application;

b) assigning the runtime context to a first thread of said database application;

c) causing the first thread of said database application to
   initiate performance, within a database server, of an operation specified by the transaction and
   store data associated with the runtime state of the first thread in the runtime context on the client;

d) determining whether a set of conditions exists; and e) if the set of conditions exists,
   i) assigning the runtime context to a second thread of said database application, and
   ii) causing the second thread to cause said database server to continue performance of the operation and store data associated with the runtime state of the second thread in the runtime context.

6. The method of claim 5, further comprising the step of determining whether the first thread completed performance of the operation and wherein the set of conditions includes the first thread did not cause said database server to complete performance of the operation.

7. The method of claim 5, further comprising the step of deallocating the runtime context independent of the runtime state of the first and second threads.

* * * * *